(12) United States Patent
Mueller et al.

(10) Patent No.: US 7,975,817 B2
(45) Date of Patent: Jul. 12, 2011

(54) BRIDGING CLUTCH BETWEEN TWO DAMPERS

(75) Inventors: Bruno Mueller, Sasbach (DE); Stephan Maienschein, Baden-Baden (DE); Thorsten Krause, Buehl (DE); Mario Degler, Baden-Baden (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 576 days.

(21) Appl. No.: 11/651,673

(22) Filed: Jan. 10, 2007

(65) Prior Publication Data

US 2007/0181395 A1 Aug. 9, 2007

Related U.S. Application Data

(60) Provisional application No. 60/758,301, filed on Jan. 12, 2006.

(51) Int. Cl.
*F16H 45/02* (2006.01)
(52) U.S. Cl. ............... 192/3.3; 192/55.61; 192/213.1
(58) Field of Classification Search ............. 192/3.3
See application file for complete search history.

(56) References Cited

U.S. PATENT DOCUMENTS

| 4,966,261 | A | * | 10/1990 | Kohno et al. | 192/3.29 |
| 5,377,796 | A | * | 1/1995 | Friedmann et al. | 192/3.29 |
| 5,695,032 | A | * | 12/1997 | Murata et al. | 192/48.1 |
| 5,762,172 | A | * | 6/1998 | Tsukamoto et al. | 192/3.29 |
| 5,881,852 | A | * | 3/1999 | Fukushima | 192/3.3 |
| 6,112,869 | A | * | 9/2000 | Krause et al. | 192/3.29 |
| 6,508,346 | B1 | * | 1/2003 | Simpson | 192/3.3 |
| 6,547,051 | B2 | * | 4/2003 | Yoshimoto et al. | 192/3.29 |
| 6,648,117 | B2 | * | 11/2003 | Shoji et al. | 192/55.61 |
| 7,036,643 | B2 | | 5/2006 | Back et al. | 192/3.3 |
| 2002/0125093 | A1 | | 9/2002 | Maienschein et al. | |

FOREIGN PATENT DOCUMENTS

| DE | 43 33 562 A1 | 4/1994 |
| DE | 101 04 346 A1 | 8/2002 |
| DE | 103 50 935 A1 | 5/2004 |
| GB | 2 271 411 A | 4/1994 |

* cited by examiner

*Primary Examiner* — Rodney H Bonck
(74) *Attorney, Agent, or Firm* — Davidson, Davidson & Kappel, LLC

(57) ABSTRACT

A torque converter is provided with a bridging clutch and two dampers, wherein the bridging clutch is positioned in the power path between the dampers. The converter is provided with a three-duct system for the oil supply.

3 Claims, 1 Drawing Sheet

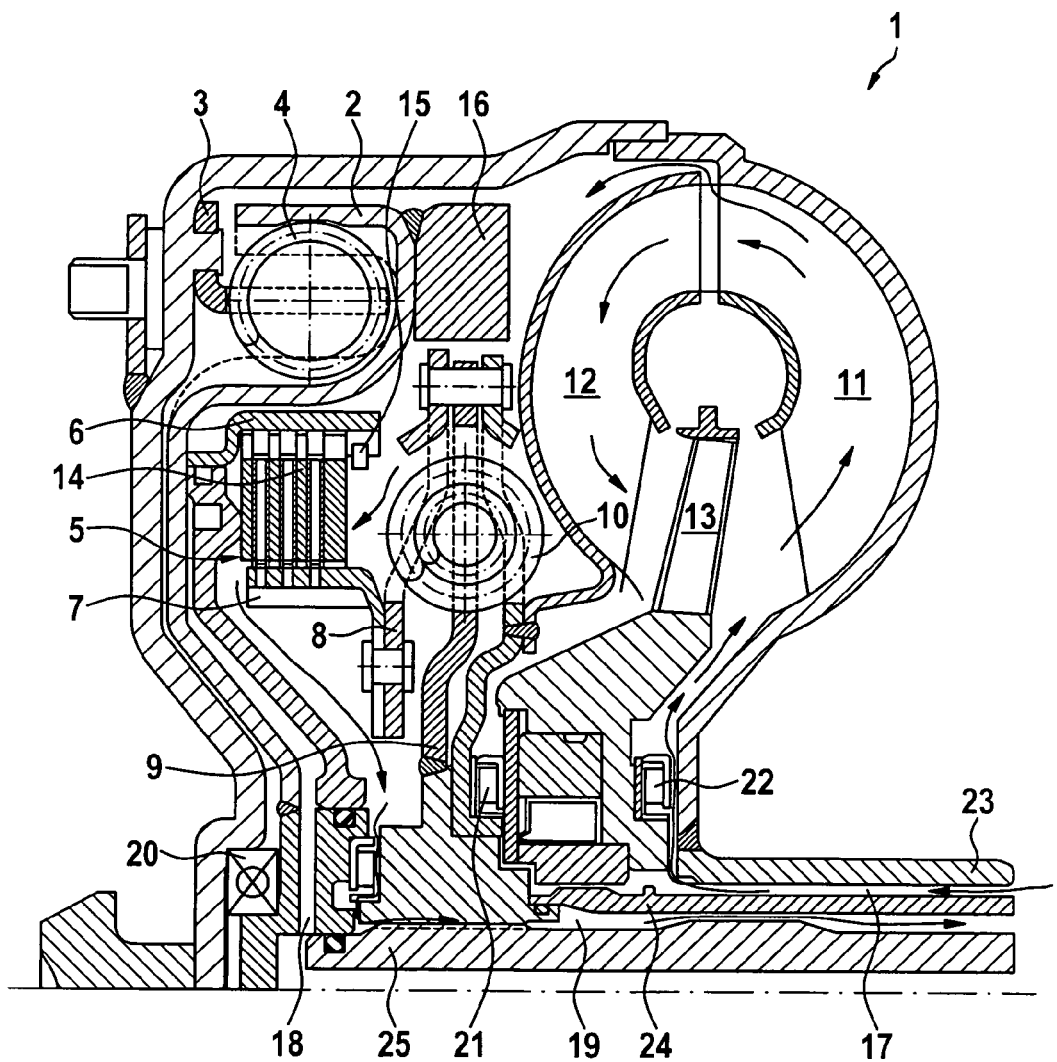

BRIDGING CLUTCH BETWEEN TWO DAMPERS

Priority to U.S. Provisional Patent Application Ser. No. 60/758,301, filed Jan. 12, 2006 is claimed, the entire disclosure of which is hereby incorporated by reference herein.

BACKGROUND INFORMATION

The present invention relates to a torque converter with two dampers and one bridging clutch, where the bridging clutch is positioned in the power path between the dampers.

From DE 43 33 562 A1 (FIG. 4), a converter is known that has a bridging clutch 218 between two dampers. The converter is provided with a two-duct system for the oil supply. It is disadvantageous here that when the bridging clutch is operated there is an axial thrust on the turbine and/or on the output part of the outer damper 250 and/or on the input part of the radially inner damper. This can result in jamming of the parts, or the function of the converter can be impaired.

SUMMARY OF THE INVENTION

In accordance with an embodiment of the present invention, a torque converter for motor vehicles is provided which comprises a bridging clutch and two dampers, wherein the bridging clutch is positioned in the power path between the dampers, and wherein the converter has a three-duct system for the oil supply.

According to another embodiment of the present invention, the bridging clutch is designed as a multiple-disk clutch.

According to yet another embodiment of the present invention, an outer disk support of the bridging clutch is attached to an output part of a radially outer damper and an inner disk support of the bridging clutch is connected to an input part of a radially inner damper in a rotationally fixed connection.

According to yet another embodiment of the present invention, a supplemental mass is attached to the output part of the radially outer damper.

BRIEF DESCRIPTION OF THE DRAWING

The FIGURE shows a half section through the converter according to an embodiment of the invention.

DETAILED DESCRIPTION

In the FIGURE a torque converter 1 can be seen, which contains in its interior the pump 11, the turbine 12, the diffuser 13 and also two dampers and a bridging clutch 5. The bridging clutch 5 is positioned in the power path between the radially outer and the radially inner damper. The bridging clutch 5 is constructed here only as an example as a multiple-disk clutch. Outer disk support 6 of the bridging clutch 5 is attached to the output part 2 of a radially outer damper and an inner disk support 7 of the bridging clutch 5 is connected to the input part 8 of the radially inner damper in a rotationally fixed connection.

The task was solved by equipping the converter with a three-duct system for the oil supply. A three-duct system has the advantage that the oil circulation can be accomplished by means of two ducts and the operation of the bridging clutch can be brought about with a separate duct. This uncoupling of the oil supply function brings an improvement of the converter function.

According to an embodiment of the present invention, the bridging clutch is situated at the output part of the radially outer damper, which is supported in the converter housing by means of roller bearings.

In FIG. 1 a torque converter 1 can be seen, which contains in its interior the pump 11, the turbine 12, the diffuser 13 and also two dampers and a bridging clutch 5. The bridging clutch 5 is positioned in the power path between the radially outer and the radially inner damper. The bridging clutch 5 is constructed here only as an example as a multiple-disk clutch. Outer disk support 6 of the bridging clutch 5 is attached to the output part 2 of a radially outer damper and an inner disk support 7 of the bridging clutch 5 is connected to the input part 8 of the radially inner damper in a rotationally fixed connection.

Important to the present invention is the design of the output part 2 of the radially outer damper. This output part is in a sense like an image of the left converter wall. In particular, the output part 2 preferably follows the contour of the left converter wall below the spring 4. This makes it possible to position the multiple-plate bridging clutch in the known manner. Another advantage is that this output part 2 has high-quality support by means of the support bearing 20.

It is also advantageous that the input part 3 of the radially outer damper extends in the axial direction. This makes it possible for pre-assembled subassemblies to simply be inserted into the housing from right to left during assembly. This design of the input part is additionally advantageous because as a result the outer damper can almost reach the outer diameter of the housing with its outer diameter.

The S-shaped design of output part 2 is also advantageous, since therefore the multiple-plate clutch can also be placed close to the housing. In addition, the upper curve of the output part 2 (to the right of spring 4) and the low design of the radially inner damper allow attachment of a supplemental mass 16 to the output part 2 of the radially outer damper. This makes it possible in an advantageous manner to tune the vibrating behavior, and hence the damping behavior of the overall damper design.

For an average person skilled in the art, the other functions and also the designs are recognizable from the reference number list. Reference is also made to DE 103 50 935 A1, the disclosure of which is hereby incorporated by reference in its entirety herein, in which all of the elements can be differentiated very thoroughly.

| | List of Reference Numerals |
|---|---|
| 1 | torque converter/converter |
| 2 | output part of the radially outer damper |
| 3 | input part of the radially outer damper |
| 4 | spring of the radially outer damper |
| 5 | bridging clutch |
| 6 | outer disk support |
| 7 | inner disk support |
| 8 | input part of the radially inner damper |
| 9 | output part of the radially inner damper |
| 10 | spring of the radially inner damper |
| 11 | pump |
| 12 | turbine |
| 13 | diffuser |
| 14 | disk |
| 15 | axial stop |
| 16 | supplemental mass |
| 17 | first duct |
| 18 | second duct |
| 19 | third duct |
| 20 | bearing |

-continued

| | List of Reference Numerals |
|---|---|
| 21 | bearing |
| 22 | bearing |
| 23 | pump throat |
| 24 | torque support |
| 25 | transmission input shaft |

What is claimed is:

1. A torque converter for motor vehicles comprising a housing, a bridging clutch and two dampers, a radially inner damper and a radially outer damper, the dampers being located in the housing, wherein the bridging clutch is positioned in the power path between the inner and outer dampers, wherein an outer disk support of the bridging clutch is directly attached to an output part of the radially outer damper and an inner disk support of the bridging clutch is connected to an input part of the radially inner damper in a rotationally fixed connection, wherein springs of the outer damper are engaged with an axially extending portion of an input part of the outer damper, the output part of the radially outer damper being a one piece element having an S-shape and a curve on the radial outer area engageable with the springs of the outer damper, the output part of the radial outer damper following a curved contour of the housing and wherein the converter has a three-duct system for the oil supply, wherein the input part of the radially inner damper is non-rotatably connected to an additional input element, the additional input element being non-rotatably and directly connected to a turbine.

2. The converter according to claim 1 wherein the bridging clutch is designed as a multiple-disk clutch.

3. The converter according to claim 1 wherein a supplemental mass is attached to the output part of the radially outer damper.

* * * * *